(12) United States Patent
Hammer et al.

(10) Patent No.: US 11,611,522 B2
(45) Date of Patent: Mar. 21, 2023

(54) PROHIBITED CONTENT PROPAGATION USING A SOCIAL NETWORK DATA STRUCTURE

(71) Applicant: Snap Inc., Santa Monica, CA (US)

(72) Inventors: Mette F. M. Hammer, Dublin (IE); Liam Harpur, Skerries (IE); Joseph M. Jaquinta, Medford, MA (US); Pauli P. O. Nurmenkari, Dublin (IE)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/561,635

(22) Filed: Dec. 23, 2021

(65) Prior Publication Data

US 2022/0124060 A1 Apr. 21, 2022

Related U.S. Application Data

(63) Continuation of application No. 16/669,083, filed on Oct. 30, 2019, now Pat. No. 11,223,589, which is a continuation of application No. 15/585,965, filed on May 3, 2017, now Pat. No. 10,491,554, which is a continuation of application No. 14/704,018, filed on
(Continued)

(51) Int. Cl.
| | |
|---|---|
| *H04L 51/212* | (2022.01) |
| *H04L 51/48* | (2022.01) |
| *H04L 51/52* | (2022.01) |
| *G06Q 50/00* | (2012.01) |
| *G06F 3/04847* | (2022.01) |

(Continued)

(52) U.S. Cl.
CPC ........ *H04L 51/212* (2022.05); *G06F 3/04847* (2013.01); *G06Q 10/107* (2013.01); *G06Q 50/01* (2013.01); *H04L 51/214* (2022.05); *H04L 51/48* (2022.05); *H04L 51/52* (2022.05)

(58) Field of Classification Search
None
See application file for complete search history.

(56) References Cited

U.S. PATENT DOCUMENTS

| | | |
|---|---|---|
| 6,119,014 A | 9/2000 | Alperovich et al. |
| 6,609,196 B1 | 8/2003 | Dickinson, III et al. |
| (Continued) | | |

OTHER PUBLICATIONS

U.S. Appl. No. 12/825,962 U.S. Pat. No. 9,092,759, Jun. 29, 2010, Controlling Email Propagation Within a Social Network Utilizing Proximity Restrictions.
(Continued)

*Primary Examiner* — Angela Nguyen
(74) *Attorney, Agent, or Firm* — Schwegman Lundberg & Woessner, P.A.

(57) ABSTRACT

A method for prohibiting email content propagation that receives, at a server, an email message. At the server, at least one email address associated with the email message which is designated not to receive a content of the email message is identified. At the server, the email message is modified by selectively removing a content of the email message to be conveyed to the at least one email address. The server conveys the modified email message to the at least one email address. The server conveys the email message to one or more recipient email addresses except the at least one email address. Consequently, the server has sent a submitted message to multiple email addresses, while modifying the content sent to a subset of the addresses that received the email message.

20 Claims, 5 Drawing Sheets

Related U.S. Application Data

May 5, 2015, now Pat. No. 9,686,216, which is a continuation of application No. 12/825,962, filed on Jun. 29, 2010, now Pat. No. 9,092,759.

(51) Int. Cl.
*H04L 51/214* (2022.01)
*G06Q 10/107* (2023.01)

(56) References Cited

U.S. PATENT DOCUMENTS

| | | | |
|---|---|---|---|
| 7,139,802 | B2 | 11/2006 | Keohane et al. |
| 7,290,035 | B2 | 10/2007 | Mattathil |
| 7,590,693 | B1 | 9/2009 | Chan et al. |
| 7,844,671 | B1 * | 11/2010 | Lawler .................... H04L 51/52 709/204 |
| 7,877,454 | B1 | 1/2011 | Hunter |
| 9,092,759 | B2 | 7/2015 | Hammer et al. |
| 9,686,216 | B2 | 6/2017 | Hammer et al. |
| 10,491,554 | B1 | 11/2019 | Hammer et al. |
| 11,223,589 | B1 | 1/2022 | Hammer et al. |
| 2003/0061289 | A1 | 3/2003 | Clissold et al. |
| 2003/0023341 | A1 | 12/2003 | Gusler et al. |
| 2004/0010552 | A1 | 1/2004 | Keohane et al. |
| 2004/0172252 | A1 | 9/2004 | Aoki et al. |
| 2007/0005717 | A1 | 1/2007 | Levasseur et al. |
| 2008/0104712 | A1 | 5/2008 | Oliver et al. |
| 2009/0031393 | A1 | 1/2009 | Denner et al. |
| 2009/0037546 | A1 | 2/2009 | Kirsch |
| 2009/0157650 | A1 | 6/2009 | Chow et al. |
| 2014/0330944 | A1 | 11/2014 | Dabbiere et al. |
| 2015/0236995 | A1 | 8/2015 | Hammer et al. |
| 2016/0050309 | A1 | 2/2016 | Gooberman |

OTHER PUBLICATIONS

U.S. Appl. No. 14/704,018 U.S. Pat. No. 9,686,216, May 5, 2015, Server Side Email Content Modification to Selected Email Recipients.

U.S. Appl. No. 15/585,965 U.S. Pat. No. 10,491,554, May 3, 2017, Prohibited Content Propagation using a Social Network Data Structure.

U.S. Appl. No. 16/669,083 U.S. Pat. No. 11,223,589, Oct. 30, 2019, Prohibited Content Propagation using a Social Network Data Structure.

"About Information Rights Management", retrieved from the Internet: <http://office.microsoft.com/en-us/help/HP062208591033.aspx>, (2010), 2 pgs.

"U.S. Appl. No. 12/825,962, Final Office Action dated Sep. 21, 2012", 25 pgs.

"U.S. Appl. No. 12/825,962, Non Final Office Action dated May 25, 2012", 21 pgs.

"U.S. Appl. No. 12/825,962, Non Final Office Action dated Jun. 19, 2014", 11 pgs.

"U.S. Appl. No. 12/825,962, Notice of Allowance dated Feb. 6, 2015", 9 pgs.

"U.S. Appl. No. 12/825,962, Response filed Jun. 11, 2012 to Non Final Office Action dated May 25, 2012", 21 pgs.

"U.S. Appl. No. 12/825,962, Response filed Jul. 1, 2014 to Non Final Office Action dated Jun. 19, 2014", 6 pgs.

"U.S. Appl. No. 12/825,962, Response filed Dec. 19, 2012 to Final Office Action dated Sep. 21, 2012", 19 pgs.

"U.S. Appl. No. 14/704,018, Examiner Interview Summary dated Dec. 1, 2016", 8 pgs.

"U.S. Appl. No. 14/704,018, Final Office Action dated Apr. 22, 2016", 14 pgs.

"U.S. Appl. No. 14/704,018, Non Final Office Action dated Aug. 18, 2016", 6 pgs.

"U.S. Appl. No. 14/704,018, Non Final Office Action dated Oct. 21, 2015", 12 pgs.

"U.S. Appl. No. 14/704,018, Notice of Allowance dated Feb. 2, 2017", 6 pgs.

"U.S. Appl. No. 14/704,018, PTO Response to Rule 312 Communication dated Mar. 16, 2017", 3 pgs.

"U.S. Appl. No. 14/704,018, Response filed Jan. 21, 2016 to Non Final Office Action dated Oct. 21, 2015", 12 pgs.

"U.S. Appl. No. 14/704,018, Response filed Jul. 22, 2016 to Final Office Action dated Apr. 22, 2016", 13 pgs.

"U.S. Appl. No. 14/704,018, Response filed Nov. 18, 2016 to Non Final Office Action dated Aug. 18, 2016", 11 pgs.

"U.S. Appl. No. 15/585,965, Final Office Action dated Sep. 13, 2018", 8 pgs.

"U.S. Appl. No. 15/585,965, Non Final Office Action dated Feb. 5, 2019", 9 pgs.

"U.S. Appl. No. 15/585,965, Non Final Office Action dated Feb. 23, 2018", 11 pgs.

"U.S. Appl. No. 15/585,965, Notice of Allowance dated Jul. 23, 2019", 5 pgs.

"U.S. Appl. No. 15/585,965, Preliminary Amendment filed May 5, 2017", 9 pgs.

"U.S. Appl. No. 15/585,965, Response Filed May 22, 2018 to Non Final Office Action dated Feb. 23, 2018", 14 pgs.

"U.S. Appl. No. 16/669,083, Non Final Office Action dated May 13, 2021", 6 pgs.

"U.S. Appl. No. 16/669,083, Notice of Allowance dated Sep. 2, 2021", 5 pgs.

"U.S. Appl. No. 16/669,083, Preliminary Amendment filed Oct. 30, 2019", 10.

"U.S. Appl. No. 16/669,083, Response filed Aug. 13, 2021 to Non Final Office Action dated May 13, 2021", 9 pages.

"U.S. Appl. No. 16/669,083, Supplemental Preliminary Amendment filed Apr. 20, 2020", 7 pgs.

"ECipher, Secure Email Made Simple—Email Encryption and Digital Rights Management", URL: http://www.essentialsecurity.com/products.html, (2009), 3 pgs.

"Microsoft Windows Rights Management Services Client with Service Pack 2-x86", URL: http://www.microsoft.com/downloads/details.aspx?FamilyId=02DA5107-2919-414B-A5A3-3102C7447838&displaylang=en, (2010), 2 pgs.

"Network Box Anti-Spam Technology Briefing: Network Box Email Envelope Pre-Scan", URL: http://www.network-box.co.uk/files/uploads/NetworkBox-PreEnvelopeSystemOverview.pdf, 2 pgs.

"Postini: Google Message Encryption", URL: http://www.google.com/postini/encryption.html, (2010), 2 pgs.

"Prevent E-mail Message Recipients from using Reply All or Forward", URL: http://office.microsoft.com/en-us/oullook/HA011142241033.aspx, (2010), 3 pgs.

"Response filed Dec. 13, 2018 to U.S. Appl. No. 15/585,965, Final Office Action dated Sep. 13, 2018", 14 pgs.

* cited by examiner

480 {
From: Alice <alice@ibm.com>
To: bob@ibm.com

Not To: fred@ibm.com — 482

Subject: Important Announcement
User-Agent: Lotus Notes
MIME-Version: 1.0
Date: Wed, 30 Jun 2010 16:41:30 +0100
}

474

484 {
From: Alice <alice@ibm.com>
To: bob@ibm.com

Not To: http://192.169.1.1/Policy_A — 486

Subject: Important Announcement
User-Agent: Lotus Notes
MIME-Version: 1.0
Date: Wed, 30 Jun 2010 16:41:30 +0100
}

PROHIBITED CONTENT PROPAGATION USING A SOCIAL NETWORK DATA STRUCTURE

CROSS-REFERENCE TO RELATED APPLICATIONS

This application is a continuation of U.S. patent application Ser. No. 16/669,083, filed on Oct. 30, 2019, which is a continuation of U.S. patent application Ser. No. 15/585,965, filed on May 3, 2017, which is a continuation of U.S. patent application Ser. No. 14/704,018, filed on May 5, 2015, which is a continuation of U.S. patent application Ser. No. 12/825,962, filed on Jun. 29, 2010, each of which are incorporated herein by reference in their entireties.

BACKGROUND

The present invention relates to the field of email distribution and, more particularly, to controlling email propagation within a social network utilizing proximity restrictions.

Electronic mail (email) has become an integral part of communications for many industries and enterprises. As such, email content protection is often the center of much concern within organizations. One aspect of content protection that continues to plague email users is control over which parties can receive an email once it is sent by a sender. For example, a recipient of an email can forward the email to any party which they choose. That is, the sender loses control over the email once it is communicated to recipients. As such, this can be a compromise of email conveyed content and/or security for companies and individuals. For example, an employee can accidentally forward a sensitive company email to a family member. Further, many integrity issues for individuals have arisen as a result of this problem.

These problems are further compounded when emails are communicated within a social network. In a social network, each member of the social network can be potentially connected to many other members. Currently, email solutions do not consider relationships between a sender and a recipient when conveying an email to a recipient. In many instances, email is intended for a select group of individuals which are often the recipients within the email sender's social network. Frequently, individuals outside the sender's social network are not aware of secure communication occurring within the social network. For instance, when a party not within the same social network receives an email, information within the email can often pose potential security problems for the sender and individuals within the social network. As such, it would be beneficial if email distribution can be controlled within a social network after it is sent.

BRIEF SUMMARY

One aspect of the disclosure discloses a system, method, and computer program product that receives, at a server, an email message. At the server, at least one email address associated with the email message which is designated not to receive a content of the email message is identified. At the server, the email message is modified by selectively removing a content of the email message to be conveyed to the at least one email address. The server conveys the modified email message to the at least one email address. The server conveys the email message to one or more recipient email addresses except the at least one email address. Consequently, the server has sent a submitted message to multiple email addresses, while modifying the content sent to a subset of the addresses that received the email message.

Another aspect of the disclosure is for a method, computer program product, and system for controlling email propagation within a social network utilizing proximity restrictions. A message header of an email message can be identified. The message header can comprise of an exemption field which specifies one or more email addresses that is prohibited from receiving the email message. The sending email address can be associated with a sender node and the one or more email addresses is associated with a prohibited node. The sender node and the prohibited node can be arbitrarily linked within a network that is a social structure comprising of one or more individuals and organizations which can be connected by one or more specific type of interdependency. The network can be modeled as a graph which can be a mathematical structure modeling pairwise relations between nodes and edges. The email message can be conveyed to multiple email addresses except the one or more email address associated with the exemption field.

Another aspect of the disclosure is for a system, method, and computer program product for prohibiting email propagation based on proximity comprising of a processor, a volatile memory, a bus connecting said processor, non-volatile memory, and volatile memory to each other, wherein the volatile memory comprises computer usable program code execute-able by the processor. The computer usable program code can comprise of an email message. The email message can include a message header including an exemption field which is associated with one or more email addresses prohibited from receiving the email message. The one or more email addresses can be associated with a prohibited node which can be a component of a network. The network can be modeled as a graph which can be a mathematical structure modeling pairwise relations between nodes and edges. A proximity engine can be configured to determine a distance metric between a sender node and a recipient node of a network, compare the distance metric to a threshold value, and perform a programmatic action in response to the comparing. A notification engine can convey a notification to a sender node and another node responsive to a communication action performed on the email message, where the communication action violates a policy setting associated with a policy. A policy can be configured to identify one or more nodes prohibited from receiving the email message and one prohibited communication action associated with the one or more nodes based on the proximity from the sender node.

DETAILED DESCRIPTION

The present disclosure is a solution for controlling email propagation within a social network utilizing proximity restrictions. In the solution, a proximity policy can be associated with an email message enabling the email to remain under the control of the sender after it is conveyed. The proximity policy can specify the nodes (e.g., members) within a social network that the email message is allowed to be communicated. For instance, a user can prohibit an email message from being forwarded to someone outside their immediate social network (e.g., one degree of separation). Further, the proximity policy can be utilized to notify a sender if the policy was violated, enabling the sender to maintain control and awareness of the email after it is sent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
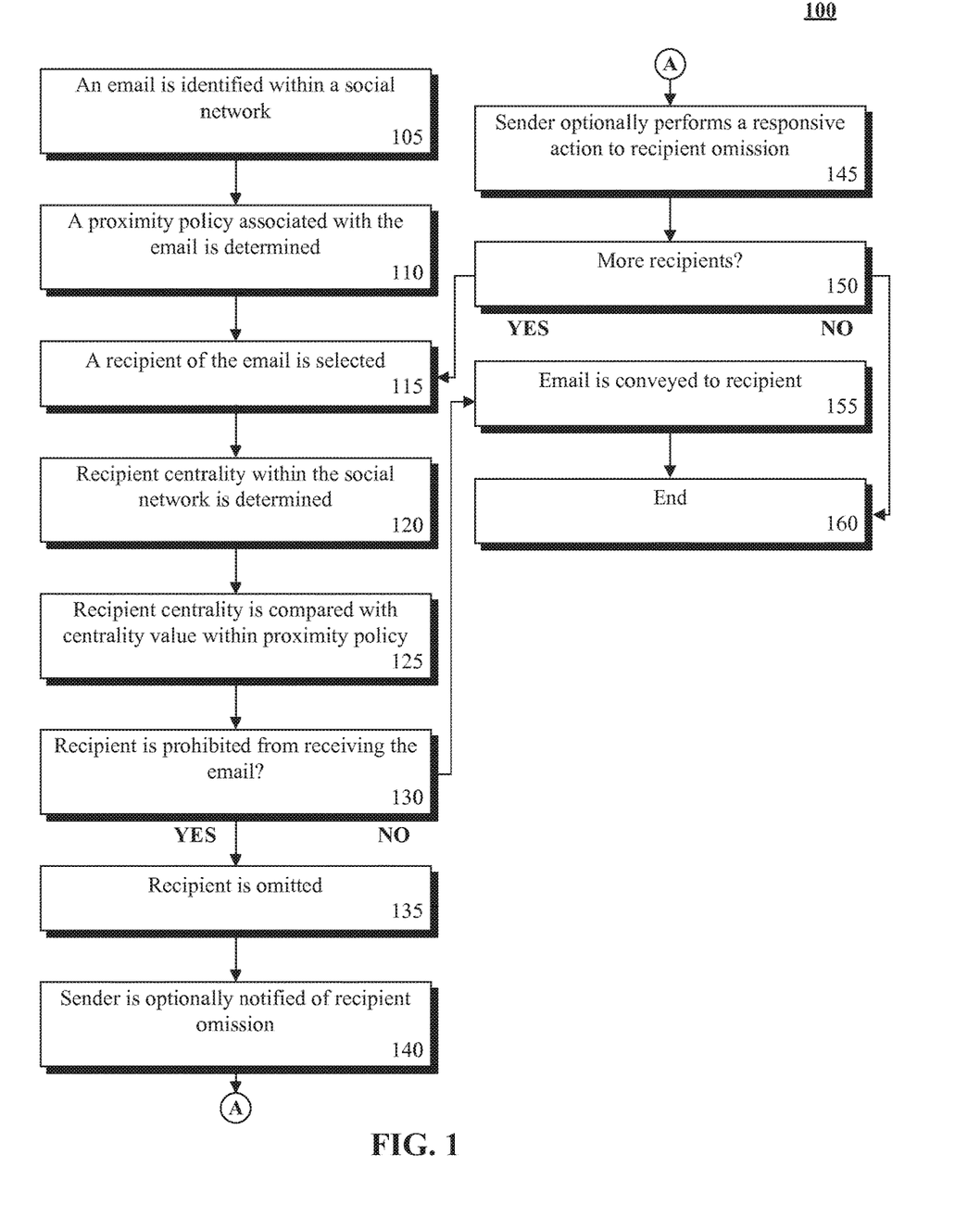
FIG. 1 is a flowchart illustrating a method for controlling email propagation within a social network utilizing proximity restrictions in accordance with an embodiment of inventive arrangements disclosed herein.

FIG. 1 is a flowchart illustrating a method 100 for controlling email propagation within a social network utilizing proximity restrictions in accordance with an embodiment of inventive arrangements disclosed herein. In method 100, an email within a social network can be identified which can be selectively conveyed to recipients based on the proximity. Proximity can include, but is not limited to, betweenness, centrality, closeness, cohesion, degree, density, eigenvector centrality, path length, and the like. For example, an email can be limited to only three degrees of separation within a social network. That is, recipients greater than three degrees away from a sender of an email can be prohibited from receiving the email.

In step 105, an email within a social network can be identified. Identification of the email can be automatically performed and/or manually performed. In step 110, a proximity policy associated with the email can be determined. The proximity policy can be determined utilizing one or more mechanisms including manual identification and automated identification processes. In one embodiment, header control information can be used to indicate a proximity policy associated with the email. For instance, the header control information can include a "Not To" field which can indicate the location of one or more appropriate proximity policy. In one instance, tags associated with an email can be utilized to programmatically identify one or more appropriate policies.

In step 115, a recipient of the email is selected. The recipient can be selected from one or more fields including, but not limited to, the "to" field, the "cc" field, the "bcc" field, and the like. That is, the recipient email address can be identified through analysis of the header control information within the email. The email address can be used to identify a recipient within the social network. In one embodiment, the email address can be used to determine uniquely identifiable information (e.g., user id) of a recipient to establish the recipient position within a social network. In step 120, the recipient centrality within the network is determined. The centrality can be determined utilizing one or more client-side and/or server-side functionality. Centrality can be determined using a brute-force algorithm, path determination algorithms, and the like. In step 125, the recipient centrality is compared with a centrality value associated with the proximity profile. Comparison can include, direct comparison of centrality values, threshold value approximation, and the like. For instance, if the centrality value of the recipient is less than the centrality value of the proximity profile, the email can be permitted to be communicated to the recipient.

In step 130, if the recipient is prohibited from receiving the email based on the comparing step, the method can continue to step 135, else proceed to step 155. In step 135, the recipient can be omitted. In one instance, the recipient can be removed from the email prior to communication of the email. For instance, the email address of the recipient can be removed from the email header. In step 140, the sender of the email can be optionally notified of recipient omission. In step 145, the sender can optionally, perform a responsive action to the recipient omission. In step 150, if there are more recipients associated with the email, the method can proceed to step 115, else proceed to step 160. In step 155, the email can be conveyed to appropriate recipients who do not violate the proximity policy associated with the email. In step 160, the method can end.

Drawings presented herein are for illustrative purposes only and should not be construed to limit the invention in any regard. Social network can refer to a social structure comprising of individuals and/or organizations (e.g., nodes), which are connected by one or more specific types of interdependency, including, but not limited to, friendship, kinship, common interest, financial exchange, likes, dislikes, relationships of beliefs, knowledge, prestige, and the like. In one embodiment, the social network can be represented within a computing network as a graph, wherein the graph is a mathematical structure modeling pairwise relations between nodes (e.g., members) and edges (interdependency). Social network can include internal social network, external social network, and the like. For instance, social network can be a network of employees within a corporation. Social network can include, but is not limited to, LINKEDIN, FACEBOOK, MYSPACE, ORKUT, FRIENDSTER, TWITTER, and the like. It should be appreciated, method 100 can be performed in real-time or near real-time.

Figure 2:
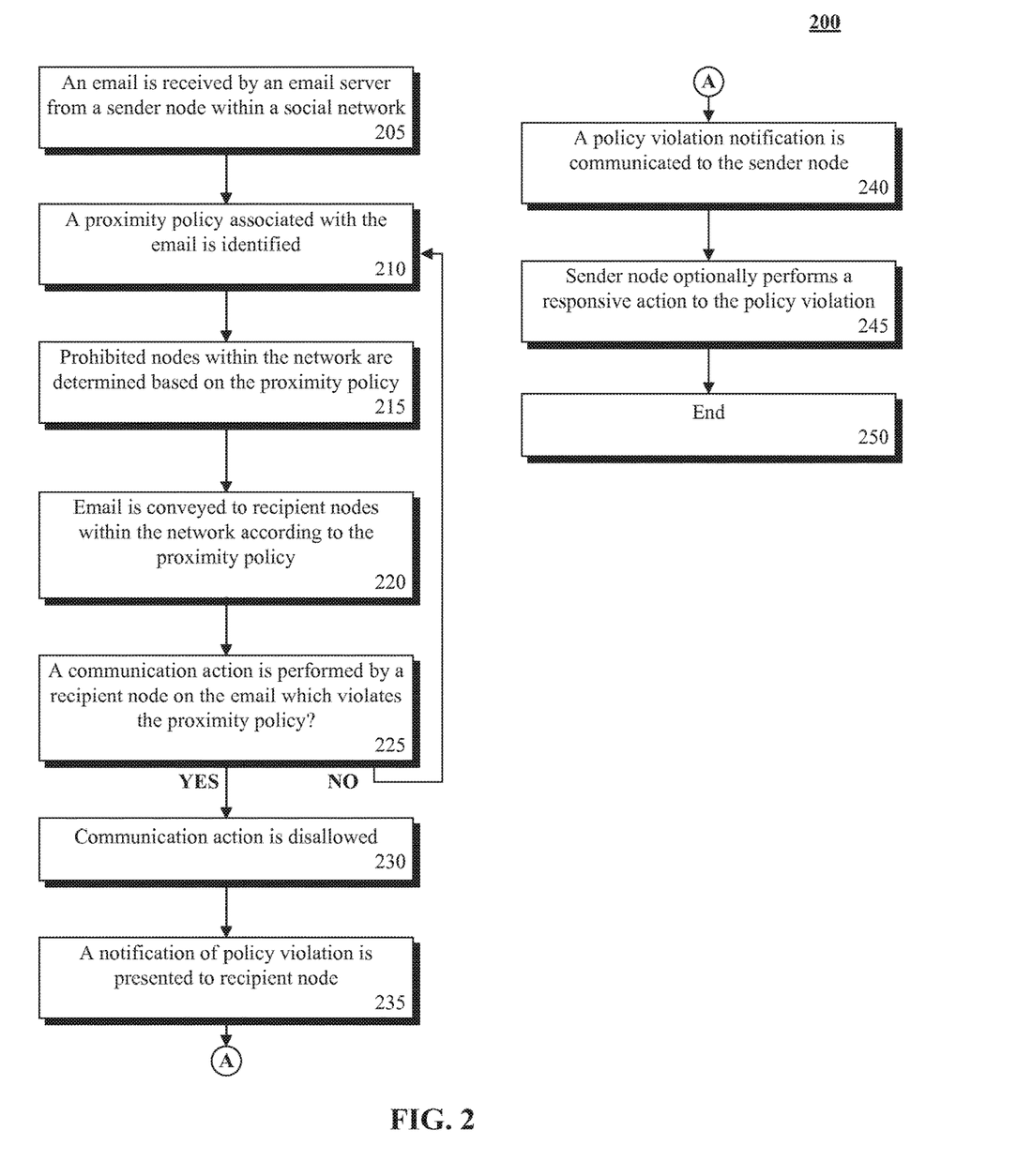
FIG. 2 is a flowchart illustrating a method for controlling email propagation within a social network utilizing server-based proximity restrictions in accordance with an embodiment of inventive arrangements disclosed herein.

FIG. 2 is a flowchart illustrating a method 200 for controlling email propagation within a social network utilizing server-based proximity restrictions in accordance with an embodiment of inventive arrangements disclosed herein. Method 200 presents one scenario for managing email distribution via proximity policies. In method 200, an email from a sender node (e.g., member) within a social network can retain control of the email distribution once the email has been communicated to recipient nodes (e.g., connected members). That is, a member of social network can restrict which members within the social network can participate in an email dialogue. As such, the proximity policy can govern an email exposure throughout the lifespan of the email. The email can be associated with a proximity policy which can enable a sender node to control which recipient nodes within the social network can receive the email. For instance, Alice can assign a proximity policy to her email to Bob, who can be prohibited from forwarding the email to anyone outside Alice's social network. The proximity policy can be user-defined or automatically established based on historic data, organizational policy and/or email distribution configuration settings.

In step 205, an email can be received by an email server from a sender node within a social network. In step 210, a proximity policy associated with the email can be identified. In step 215, prohibited nodes within the network which are disallowed from receiving the email can be determined based on the proximity policy. In one embodiment, the proximity policy can define which nodes (e.g., prohibited nodes) and/or group of nodes (e.g., prohibited social networks) can be blacklisted from receiving the email. In another embodiment, the proximity policy can establish centrality values for limiting email exposure. For instance, the policy can permit an email to be delivered to anyone not close to the sales department. In step 220, the email can be conveyed to recipient nodes within the network according to the proximity policy. That is, the email can be conveyed to recipient nodes and prohibited nodes can remain unaware of the email.

In step 225, if a communication action is performed by a recipient node on the email which violates the proximity policy, the method can continue to step 230, else return to step 210. The communication action can include, but is not limited to, forwarding, reply to all, sending, and the like. For example, if Bob attempts to send a carbon copy of Alice's email to Fred, who is outside of Alice's social network, a proximity policy violation can be triggered. In step 230, the communication action can be disallowed. In one instance, the communication action can be logged within an auditing system. In step 235, a notification policy violation can be presented to the recipient node performing the communication action. The notification can be presented within a user interface such as an email application. For instance, a graphical user interface can present a dialog indicating that the communication action associated with a prohibited node is prohibited.

In step 240, a policy violation notification can be communicated to the sender node. In one instance, the policy violation notification can be communicated comprising of information including, but not limited to, timestamp associated the communication action, the prohibited node associated with the attempt, the communication action performed by the node, and the like. In step 245, the sender node can optionally perform a responsive action to the policy violation. In one instance, the responsive action can be initiating contact with the recipient node which violated the proximity policy. In step 250, the method can end.

Figure 3:
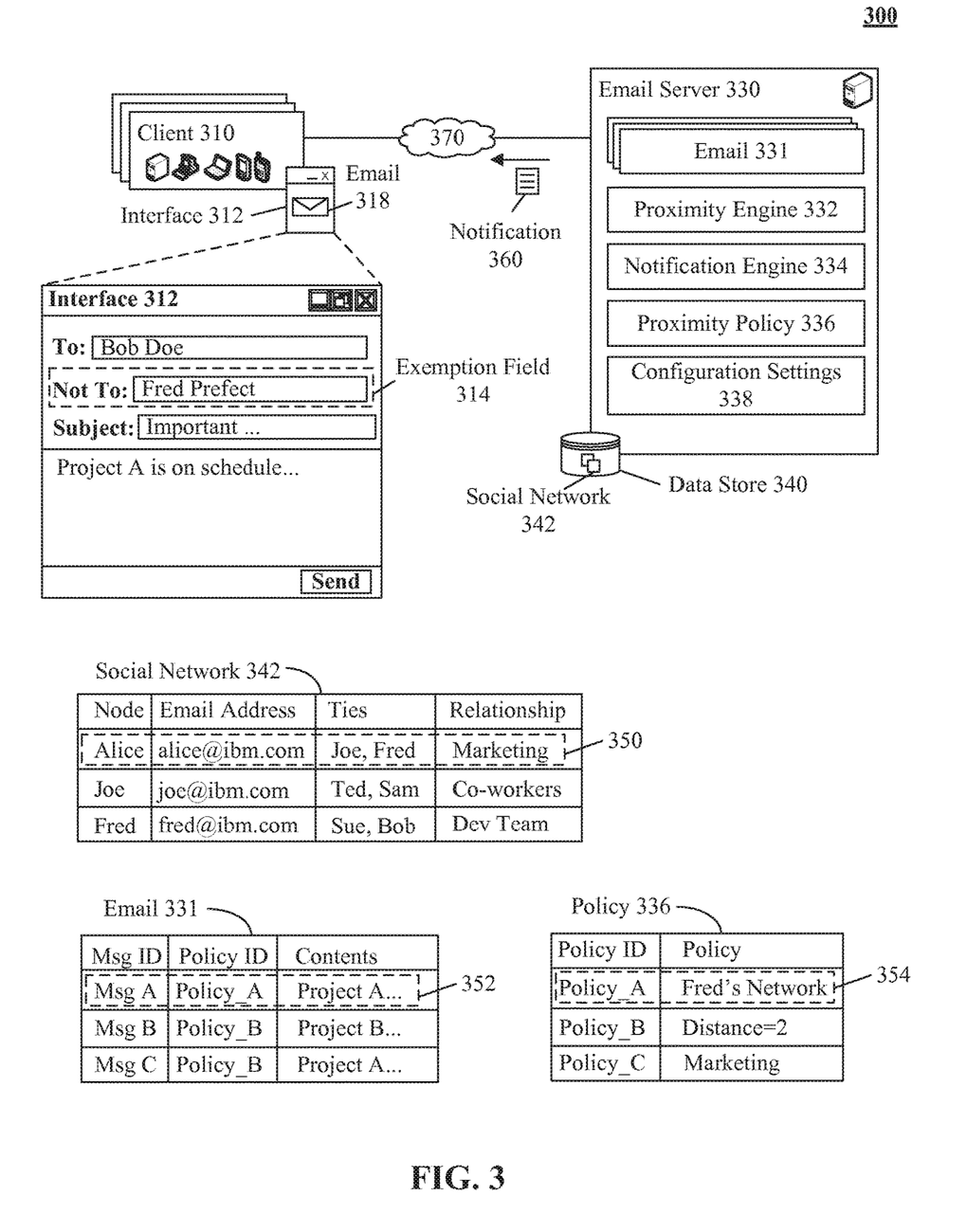
FIG. 3 is a schematic diagram illustrating a system for prohibiting email propagation within a social network based on proximity restrictions in accordance with an embodiment of inventive arrangements disclosed herein.

Drawings presented herein are for illustrative purposes only and should not be construed to limit the invention in any regard Method 200 can be performed within the context of system 300. Steps 205-245 can repeat for each instance of an email that is communicated throughout a social network.

Figure 4:
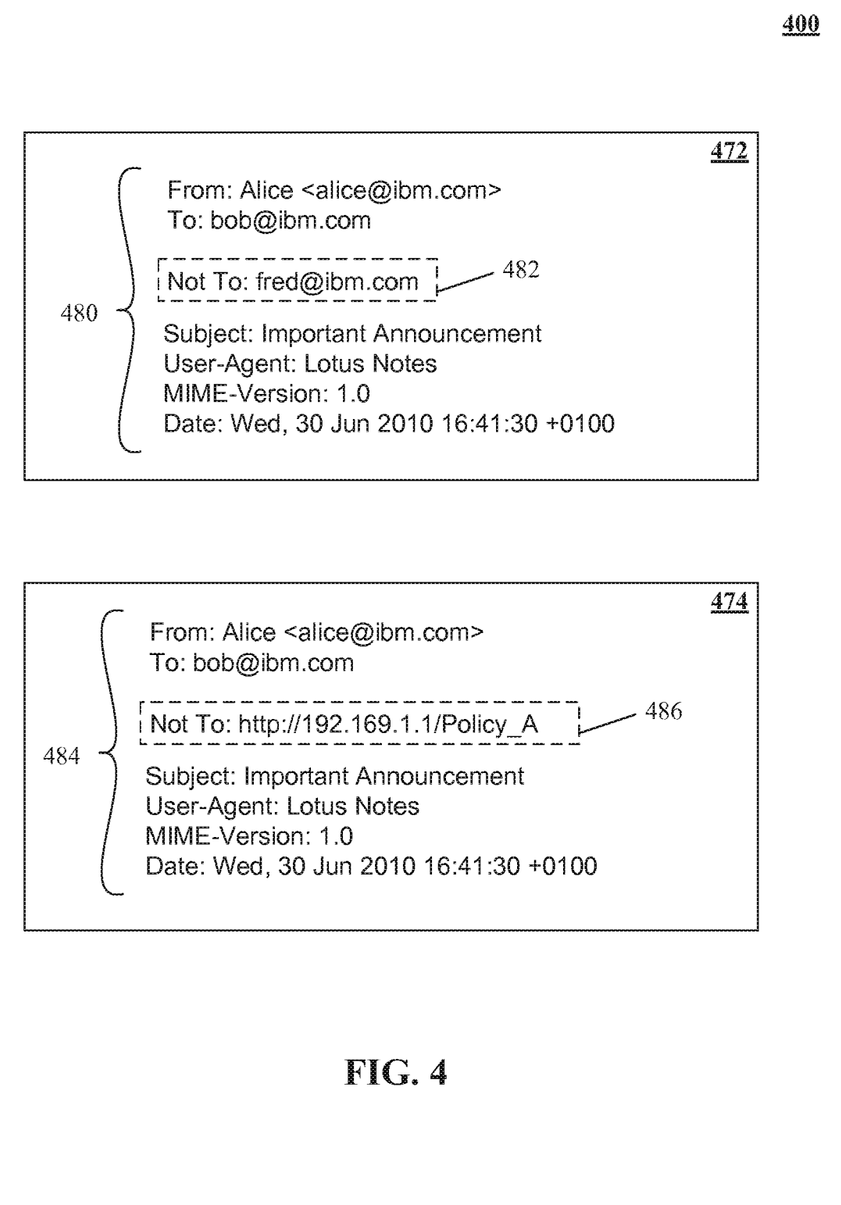
FIG. 4 is a schematic diagram illustrating an email header for prohibiting email propagation within a social network based on proximity restrictions in accordance with an embodiment of inventive arrangements disclosed herein.

FIG. 3 is a schematic diagram illustrating a system 300 for prohibiting email propagation within a social network based on proximity restrictions in accordance with an embodiment of inventive arrangements disclosed herein. System 300 can be present within the context of method 100 and 200. In system 300, proximity policy 336 can permit distribution control of email 318, 331 to one or more clients 310 based on proximity settings associated with the proximity policy 336. Email 318, 331 can be communicated to email server 330 which can be utilized to propagate email based on proximity policy 336. Turning to FIG. 4, in one embodiment 474, proximity policy 336 can be stored within server 330 which can be indicated using a Uniform Resource Locator (URI) 486 associated with header information 482. For instance, URL 486 can identify policy 354 associated with email 352. In another instance 472 proximity policy 336 can be stored within header information 480 of the email message as one or more email addresses 482.

Email 318, 331 can be a message associated with the Simple Mail Transfer Protocol (SMTP), Post Office Protocol (POP), Internet Message Access Protocol (IMAP), Hypertext Transport Protocol (HTTP), and the like. Email 318, 331 can be stored within a data store including but not limited to, hard drive, network attached storage (NAS), storage attached network (SAN), and the like. In one instance, email 318, 331 can be stored within an mbox file format. Email 318, 331 can be a user and/or automatically generated message comprising of a message header and a message body. In one embodiment, the message header can be associated with exemption field 314 which can be used to prohibit one or more nodes within network 342 from receiving email 318, 331. Message header can include control information including, but not limited to, one or more prohibited address (e.g., 482), an originator's email address, one or more recipient addresses, subject information, message id, and the like. Email body can include plain text and/or Hypertext Markup Language (HTML) content. Email 318, 331 can include multi-media content attachments (e.g., multipurpose Internet mail extensions).

As used herein, client 310 can be a computing device able to send and receive email 331. Client 310 can be mapped to a node within a social network 342 (e.g., network 370) such that client 310 can be a sender node, recipient node, or a prohibited node. Client 310 can include, but is not limited to, desktop computer, laptop, mobile phone, portable digital assistant, multimedia device, and the like. Client 310 can be communicatively linked to email server 330 via network 370. In one instance, client 310 can be associated with an interface 312.

Interface 312 can be a user interface able to permit composition and/or presentation of email 331 (e.g., mail user agent). Interface 312 can be a screen from a client-side email application such as an email client. Interface 312 can be a component of MOZILLA THUNDERBIRD, MUTT, and the like. In one instance, interface 312 can be component of a Web-based email application. In another instance, interface 312 can be a remotely executing application. Interface 312 can comprise of exemption field 314 which can permit distribution control of emails (e.g., email 318) sent from interface 312.

Exemption field 314 can be associated with proximity policy 336 which can be used to specify which clients 310 (e.g., nodes) within social network 342 can receive email 318. In one embodiment, exemption field 314 can present one or more existing proximity policies which can be applied to email 318. In another instance exemption field 314 can permit a user to create policies to be applied to email 318.

Email server 330 can be one or more hardware/software components able to prohibit communication of an email 318, 331 to a prohibited node. Email server 330 can be a mail submission agent, mail transfer agent, mail delivery agent, mail exchange, and the like. For example, email server can be a software email server application such as POSTFIX. Email server 330 can comprise of, but is not limited to, email 331, proximity engine 332, notification engine 334, proximity policy 336, configuration settings 338, and data store 340. Email server 330 can be associated with one or more entities including, but not limited to, an internet service provider (ISP), a corporation, and the like. In one instance, email server 330 can be an IBM LOTUS DOMINO server. In another instance, email server 330 can be an SENDMAIL SMTP server Proximity engine 332 can be one or more hardware/software components for determining the proximity of two or more nodes within a social network 342. Engine 332 can establish proximity metrics including, but not limited to, betweenness, centrality, closeness, cohesion, degree, density, eigenvector centrality, path length, and the like. Proximity metrics established by the engine can be used to generate proximity policies, validate proximity policies, and/or resolve proximity conflicts. Proximity engine 332 can utilize network 342 data to determine proximity between nodes. For instance, relationship data 350 can be used to determine Alice is connected to Joe and Fred through a marketing department relationship. In one embodiment, proximity engine 332 can respond to real-time changes within a social network. For instance, if Fred joins Alice's social network, Fred can participate in an email which was previously prohibited to Fred. In one configuration of the embodiment, engine 332 can retroactively apply proximity, policy 336 when a change in a social network occurs.

In one embodiment, proximity engine 332 can use presence information to prohibit communication of an email to a recipient. In the embodiment, location information (e.g., global positioning system data) of a node (e.g., user) can be used to dynamically restrict email messages from being conveyed to the node.

Notification engine 334 can be one or more hardware/software components able to generate a notification 360 responsive to a proximity policy violation. Engine 334 can convey notification 360 when proximity policy 336 is violated by a node (e.g., client 310). In one embodiment, engine 334 can store policy violations which can be accessed during auditing processes. In one instance, notification engine 334 can operate in real-time to generate policy violation warnings to users of interface 312.

Notification 360 can be a message identifying one or more proximity policy violations associated with an email 318, 331. Notification 360 can be an email, Short Message Service (SMS) message, voice message, instant message (IM) and the like. Notification 360 can be customized via proximity profile 336 and/or configuration settings 338. For instance, notification 360 can generate an email notification to all participants of an email conversation when the proximity policy of the email is violated.

Proximity policy 336 can be one or more rulesets for establishing prohibited nodes within a social network 342 which are disallowed from receiving email 318, 331. Proximity policy 336 can be applied arbitrarily to any portion of a social network. For instance, policy 336 can be applied to subgroups (e.g., cliques) within a social network. In one embodiment, proximity policy 336 can be associated with metrics for limiting email communication. For example, a forwarding threshold value can be utilized to restrict the number of times an email can be forwarded. In one embodiment, policy 336 can be associated with an expiration value which can enable the policy 336 to be enforced for a set period of time. For example, a policy can restrict emails from being forwarded outside of a development team's social network prior to a product release date. Further, proximity policy 336 can be associated with administrative settings permitting authorized parties to view and/or modify policy 336.

In one instance, proximity policy 336 can be used to selectively expose content of an email based on the proximity of a recipient node from a sender node. In one configuration of the instance, attachments can be selectively removed based on policy settings. For example, when the email 331 is delivered to a recipient outside of a sender's social network, image attachments associated with the email 331 can be removed. In another configuration of the instance, portions of the message body of the email 331 can be omitted when the email 331 is communicated to selected recipients.

Configuration settings 338 can be one or more local and/or global email settings for enabling system 300 functionality. Configuration settings 338 can include, but are not limited to, permitted proximity values, administrative settings, and the like. In one instance, settings 338 can allow customize proximity values to be used. For instance, settings 338 can allow physical proximity values to be used to control email propagation. In another instance, settings 338 can permit organizational proximity policies to override individual defined proximity policies.

Social network 342 can be one or more social structures associated with system 300. Social network 342 information can be stored within data store 340. In one instance social network 342 can be associated with a directory service. For instance, social network 342 can be associated with an IBM TIVOLI DIRECTORY SERVER. In the instance, network 342 information can be queried to determine proximity information for establishing node proximity.

In one instance, data store 340 can be a relational database including, but not limited to, relational database management system (RDBMS), object database management system (ODBMS), and the like. In another instance, data store 340 can be a NAS, SAN, and the like.

Drawings presented herein are for illustrative purposes only and should not be construed to limit the invention in any regard. System 300 functionality can be encapsulated within a middleware software including, but not limited to, IBM WEBSPHERE. System 300 can be one or more components of a distributed computing system, network computing system, and the like. Its one instance, system 300 functionality can be accessible through a Web-based service. In one embodiment, components 332-338 can be integrated with a client-side email application. Email 318, 331 can be stored within client 310 and/or within server 330. In one embodiment, system 300 functionality can be a component of a client-side email application.

Figure 5:
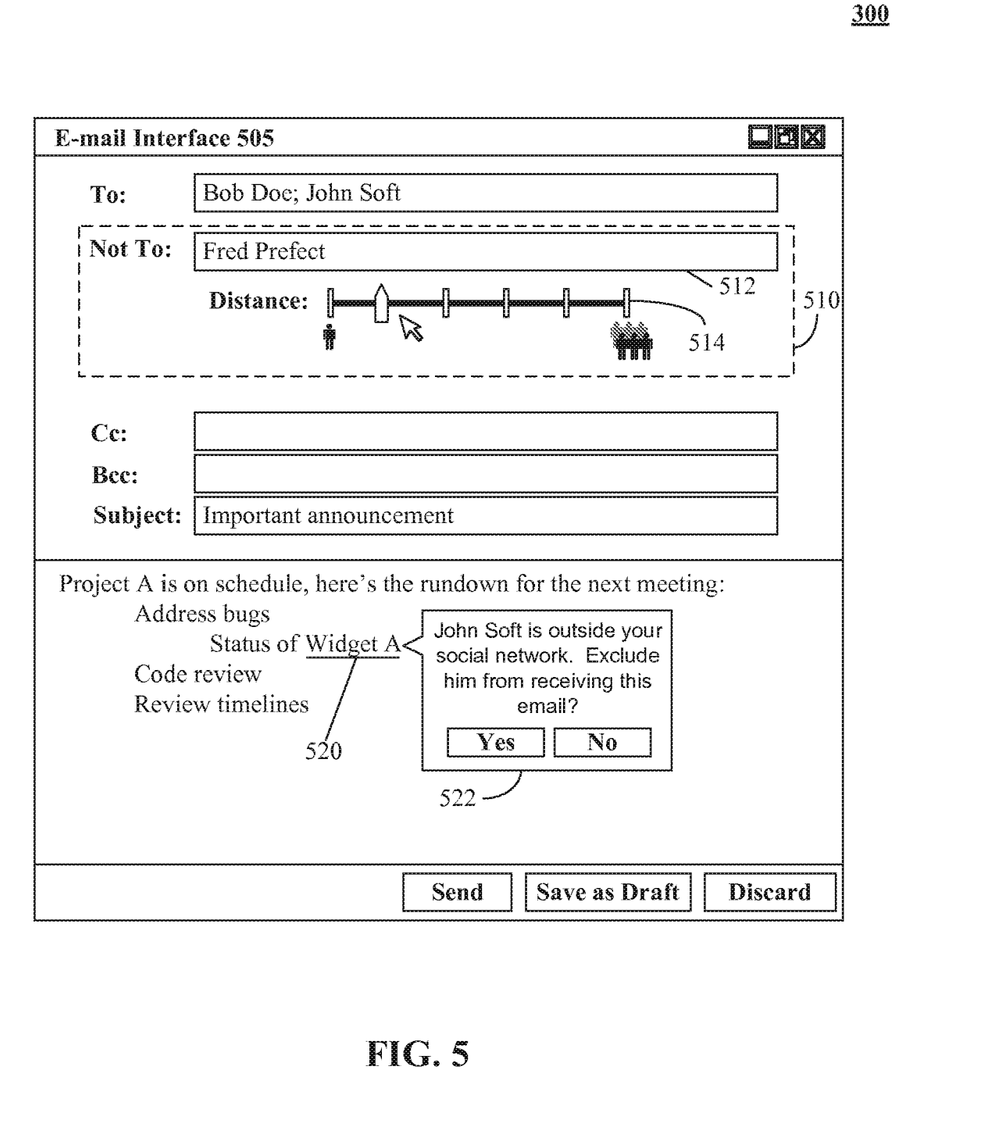
FIG. 5 is a schematic diagram illustrating an interface 305 for prohibiting email propagation within a social network based on proximity restrictions in accordance with an embodiment of inventive arrangements disclosed herein.

FIG. 5 is a schematic diagram illustrating an interface 505 for prohibiting email propagation within a social network based on proximity restrictions in accordance with an embodiment of inventive arrangements disclosed herein. In interface 505, a user can specify one or more nodes (e.g., members) of a social network which can be prohibited from receiving an email based on a distance metric setting associated with the email 510. Prohibited nodes can be user specified or automatically determined as shown in section 510 and suggestion 522. Interface 505 can be one or more screens of an email application. In one instance, the application can be a client-side application permitting selective control of email distribution within a social network. For example, interface 505 can be a screen from an IBM LOTUS NOTES application.

In section 510, a user can utilize an exemption field 512 and/or a slider element 514 to specify prohibited nodes within a social network. Section 510 can be used to establish a proximity policy for an email associated with the interface 505. For instance, a user can establish a proximity policy for an email by utilizing field 512 and/or element 514. In one instance, exemption field 512 and slider element 514 can be linked. In one configuration of the embodiment, manipulation of the slider element 514 can automatically populate field 512. In another configuration of the embodiment, exemption field 512 can be used to set which nodes can be prohibited while slider element 514 can be used to specify additional prohibited nodes based on a distance from a sender node. In one embodiment, field 512 and element 514 can be used in an mutually exclusive fashion.

Exemption field 512 can be a user interface element permitting user established control of an email via user input. Exemption field 512 can be a text field used for identifying prohibited nodes within the social network. Field 512 can accept a variety of user input including, canonical names, usernames, email addresses, keywords, relationship information and the like.

Slider element 514 can be utilized to specify a distance metric from a sender node to which the email cannot be delivered. Element 514 can include a range from one degree of separation (e.g., friend of a friend) to six degrees of separation (e.g., everyone in the social network). In one instance, element 514 can be automatically positioned based on input within exemption field 512. Element 514 can be used to specify a maximum and/or minimum distance that the email can be propagated. In another instance, the slider can be used to specify the "levels" of forwarding or "reply to all" which are allowed.

In one embodiment, prohibited nodes can be automatically determined based on content of an email within interface 505. Based on a previously established proximity policy, text 520 can trigger pop-up 522 to be presented. Pop-up 522 can present a user with an option to automatically prohibit appropriate nodes from receiving the email based on the text 520. For example, when text 520 comprises of the keyword "Widget A", John Soft can be automatically identified as a candidate who cannot receive the email. In one instance, pop-up 522 can be used to automatically add a prohibited node to exemption field 512. For instance, when a user selects "Yes", the pop-up 522 can trigger John Soft to be programmatically removed from the "To" field and placed within the "Not To" field 512.

Drawings presented herein are for illustrative purposes only and should not be construed to limit the invention in any regard. Interface 505 can be a component of a graphical user interface (GUI), voice user interface (VUI), mixed-mode interface, and the like. Interface elements within interface 505 can include, but are not limited to, text field, sliders, drop down boxes, radio buttons, checkboxes, and the like. In one instance, section 510 can graphically present a list of each node associated with a sender node which can be excluded. In the instance, each node can be associated with a checkbox for selecting the node to exclude. For instance, a checkbox can be presented next to a profile picture of a member within a social network that can be disallowed from receiving an email composed within interface 505.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s), It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    receiving, at a server, from a client device, a message comprising metadata indicating a proximity policy and a social network policy,
        the proximity policy specifying a location requirement to access the message,
        the social network policy specifying a social network connection degree threshold requirement of a social network data structure to access the message;
    identifying a first set of user nodes, from the social network data structure, that is allowed to access the message based on the first set of user nodes satisfying the location requirement;
    identifying a second set of user nodes, from the social network data structure, that is allowed to access the message based on the second set of user nodes satisfying the social network connection degree threshold requirement relative to the first set of user nodes; and
    conveying, by the server, the message to other client devices based at least in part on the first set of user nodes and the second set of user nodes.

2. The method of claim 1, further comprising:
    identifying a first subset of the second set of user nodes that satisfies the location requirement; and
    identifying a second subset of the second set of user nodes that fails to satisfy the location requirement.

3. The method of claim 2, wherein conveying the message further comprises:
    conveying the message to the other clients devices of the first set of user nodes, and the first and second subsets of the second set of user nodes.

4. The method of claim 2, wherein conveying the message further comprises:
    conveying the message only to the other clients devices of the first set of user nodes, and the first subset of the second set of user nodes.

5. The method of claim 2, further comprising:
    modifying a content of the message for the second subset of the second set of user nodes,
    wherein conveying the message further comprises:
    conveying the message only to the other clients devices of the first set of user nodes and the first subset of the second set of user nodes; and
    conveying the modified content of the message only to the other clients devices of the second subset of the second set of user nodes.

6. The method of claim 2, wherein the location requirement identifies a geographic region, within a distance of a geographic location of the client device, where user nodes of the social network data structure can access the message.

7. The method of claim 6, further comprising:
    receiving location data from the other client devices of the first set of user nodes,
    wherein identifying the first set of user nodes further comprises:
    determining that the location data of the other client devices of the first set of user nodes indicate that the first set of user nodes is located within the geographic region.

8. The method of claim 6, further comprising:
    receiving location data from the other client devices of the second set of user nodes,
    wherein identifying the first subset of the second set of user nodes further comprises:
    determining that the location data of the other client devices of the first subset of the second set of user nodes indicate that the first subset of the second set of user nodes is located within the geographic region,
    wherein identifying the second subset of the second set of user nodes further comprises:
    determining that the location data of the other client devices of the second subset of the second set of user nodes indicate that the second subset of the second set of user nodes is located outside the geographic region.

9. The method of claim 1, further comprising:
    causing display of an exemption field on the client device, the exemption field operable to receive one or more keywords for configuration of the proximity policy.

10. The method of claim 1, wherein the metadata is header data of the message, wherein the social network data structure comprises a plurality of nodes connected by edges, wherein the message is an electronic message using at least one of:

Simple Mail Transfer Protocol (SMTP), Post Office Protocol (POP), Internet Message Access Protocol (IMAP), Hypertext Transport Protocol (HTTP).

11. A system comprising:

one or more processors of a machine; and a memory storing instructions that, when executed by the one or more processors, cause the machine to perform operations comprising:

receiving, at the machine, from a client device, a message comprising metadata indicating a proximity policy and a social network policy, the proximity policy specifying a location requirement to access the message;

the social network policy specifying a social network connection degree threshold requirement of a social network data structure to access the message;

identifying a first set of user nodes, from the social network data structure, that is allowed to access the message based on the first set of user nodes satisfying the location requirement;

identifying a second set of user nodes, from the social network data structure, that is allowed to access the message based on the second set of user nodes satisfying the social network connection degree threshold requirement relative to the first set of user nodes; and conveying, by the machine, the message to other client devices based at least in part on the first set of user nodes and the second set of user nodes.

12. The system of claim 11, wherein the operations further comprise:

identifying a first subset of the second set of user nodes that satisfies the location requirement; and identifying a second subset of the second set of user nodes that fails to satisfy the location requirement.

13. The system of claim 12, wherein conveying the message further comprises:

conveying the message to the other clients devices of the first set of user nodes, and the first and second subsets of the second set of user nodes.

14. The system of claim 12, wherein conveying the message further comprises:

conveying the message only to the other clients devices of the first set of user nodes, and the first subset of the second set of user nodes.

15. The system of claim 12, wherein the operations further comprise:

modifying a content of the message for the second subset of the second set of user nodes, wherein conveying the message further comprises:

conveying the message only to the other clients devices of the first set of user nodes and the first subset of the second set of user nodes; and conveying the modified content of the message only to the other clients devices of the second subset of the second set of user nodes.

16. The system of claim 12, wherein the location requirement identifies a geographic region, within a distance of a geographic location of the client device, where user nodes of the social network data structure can access the message.

17. The system of claim 16, wherein the operations further comprise:

receiving location data from the other client devices of the first set of user nodes, wherein identifying the first set of user nodes further comprises:

determining that the location data of the other client devices of the first set of user nodes indicate that the first set of user nodes is located within the geographic region.

18. The system of claim 16, wherein the operations further comprise:

receiving location data from the other client devices of the second set of user nodes, wherein identifying the first subset of the second set of user nodes further comprises:

determining that the location data of the other client devices of the first subset of the second set of user nodes indicate that the first subset of the second set of user nodes is located within the geographic region, wherein identifying the second subset of the second set of user nodes further comprises:

determining that the location data of the other client devices of the second subset of the second set of user nodes indicate that the second subset of the second set of user nodes is located outside the geographic region.

19. The system of claim 11, wherein the operations further comprise:

causing display of an exemption field on the client device, the exemption field operable to receive one or more keywords for configuration of the proximity policy.

20. A non-transitory machine-readable storage device embodying instructions that, when executed by a machine, cause the machine to perform operations comprising:

receiving, at a server, from a client device, a message comprising metadata indicating a proximity policy and a social network policy, the proximity policy specifying a location requirement to access the message, the social network policy specifying a social network connection degree threshold requirement of a social network data structure to access the message;

identifying a first set of user nodes, from the social network data structure, that is allowed to access the message based on the first set of user nodes satisfying the location requirement;

identifying a second set of user nodes, from the social network data structure, that is allowed to access the message based on the second set of user nodes satisfying the social network connection degree threshold requirement relative to the first set of user nodes; and conveying, by the server, the message to other client devices based at least in part on the first set of user nodes and the second set of user nodes.

* * * * *

UNITED STATES PATENT AND TRADEMARK OFFICE
CERTIFICATE OF CORRECTION

Page 1 of 1

PATENT NO. : 11,611,522 B2
APPLICATION NO. : 17/561635
DATED : March 21, 2023
INVENTOR(S) : Hammer et al.

It is certified that error appears in the above-identified patent and that said Letters Patent is hereby corrected as shown below:

On the Title Page

On page 2, in Column 1, under Item (56) "U.S. Patent Documents", Line 12, delete "2003/0023341" and insert --2003/0233410-- therefor On page 2, in Column 2, under Item (56) "Other Publications", Line 43, delete ""ECipher," and insert --"eCipher,-- therefor Signed and Sealed this
Eighteenth Day of June, 2024

Katherine Kelly Vidal
*Director of the United States Patent and Trademark Office*